Figure 1:
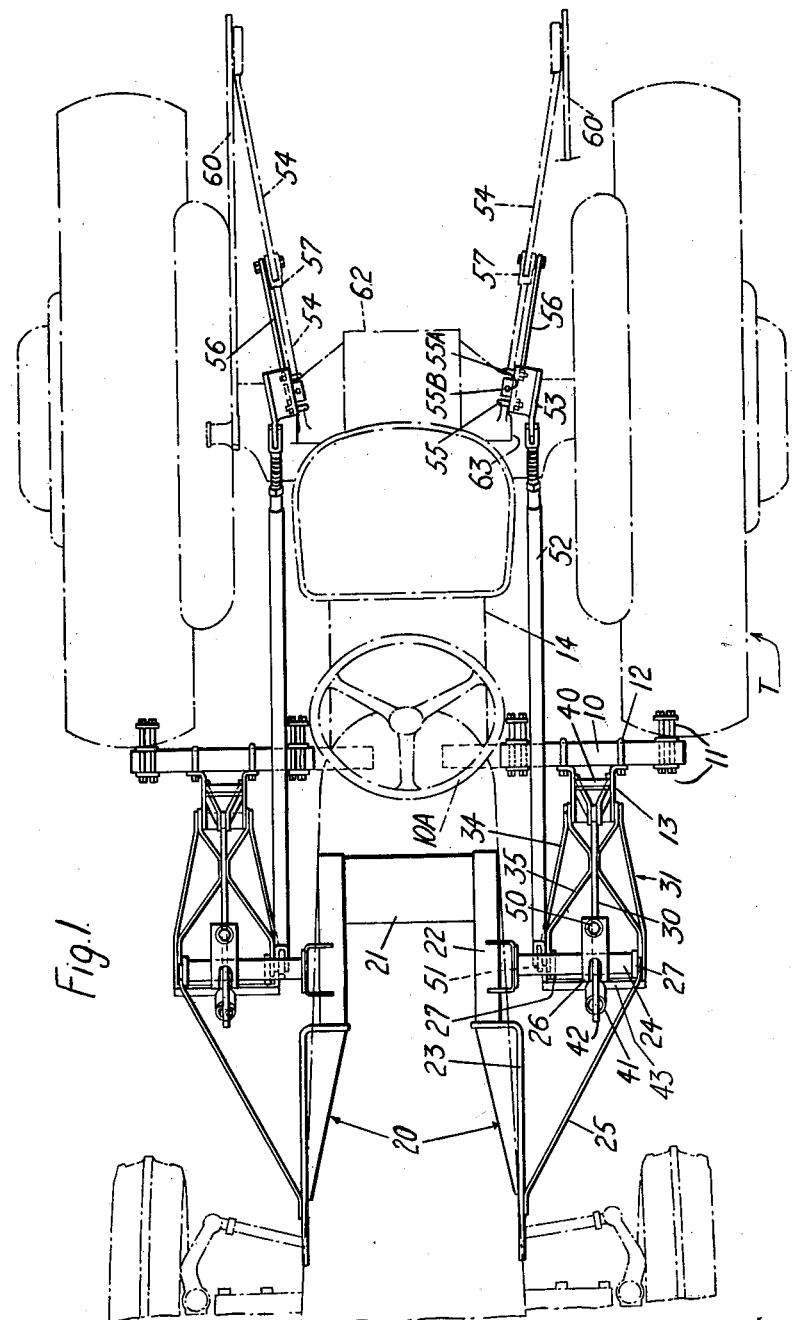

July 30, 1963   A. F. WILLIAMS   3,099,322
FOLD-UP MID-MOUNTING FOR AGRICULTURAL IMPLEMENTS
Filed Feb. 1, 1961   2 Sheets-Sheet 1

Inventor
ALAN WILLIAMS
By Wolfe, Hubbard, Voit & Osann
Attorneys

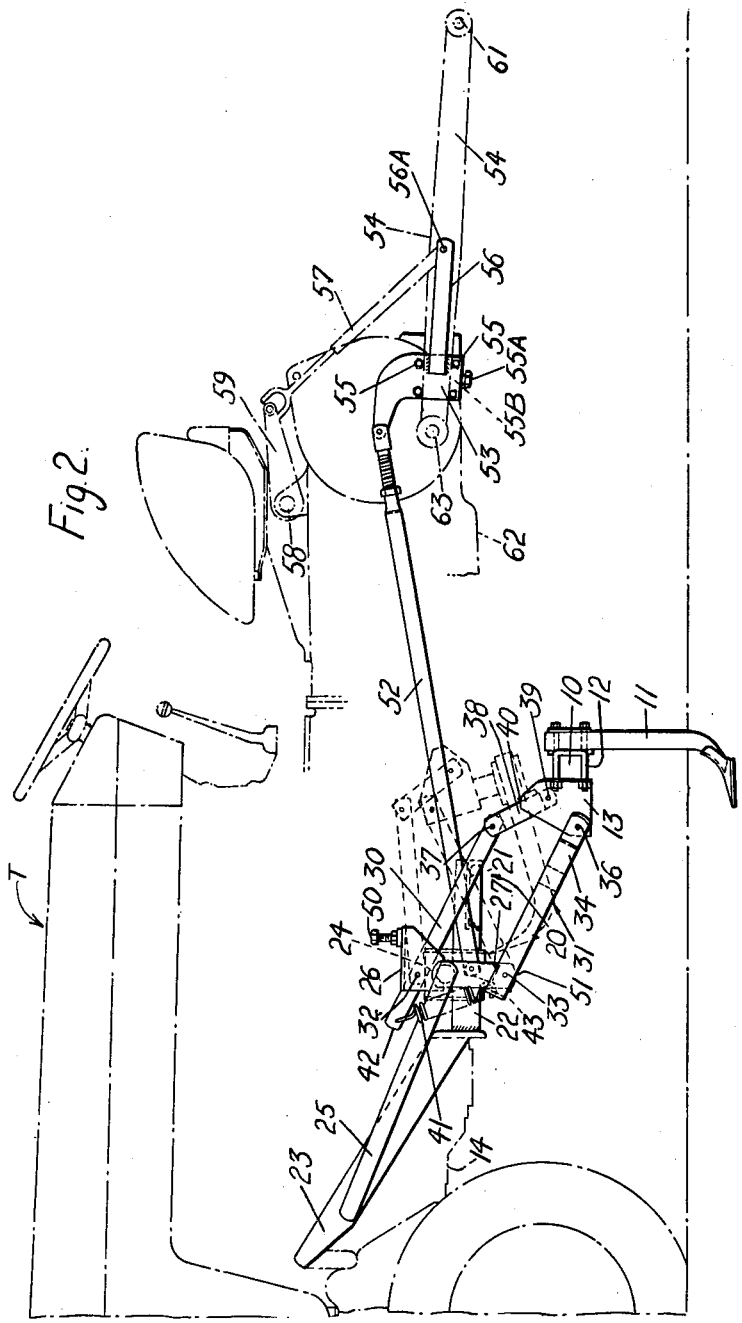

3,099,322
FOLD-UP MID-MOUNTING FOR AGRICULTURAL IMPLEMENTS
Alan Foulkes Williams, Strathmore, Victoria, Australia, assignor to Massey-Ferguson (Australia) Limited, Sunshine, Victoria, Australia
Filed Feb. 1, 1961, Ser. No. 86,350
2 Claims. (Cl. 172—307)

The present invention relates to mounting arrangements for supporting agricultural implements on tractors and concerns, more particularly, a mid-mounting structure for positioning the implement between the front and rear axles of the tractor.

Certain types of agricultural earth-working implements can be advantageously employed when positioned beneath the center portion of a tractor. Inherently, very limited ground clearance is available for mounting implements in this position and, hence, it is difficult to provide both an adequate range of earth-working positions as well as a transport position in which the implement is well clear of the ground.

Moreover, most modern tractors are provided with power lift arrangements for their conventional rear hitches, and it is quite desirable to use this power for controlling the positioning of mid-mounted implements.

It is, therefore, the primary aim of the invention to provide an implement mid-mounting arrangement; that is, a mounting to support implements beneath the center portion of the tractor; which rigidly supports an implement through a full range of earth-working positions and also is capable of swinging the implement to a high-clearance transport position.

Moreover, it is an object of the invention to provide an implement mid-mounting arrangement of the above type which is operated by conventional manipulation of the power lift for the rear hitch of the tractor.

Another object is to provide a mid-mounting arrangement as characterized above that holds the implement in a fixed angular relationship with the ground and moves the implement in a substantially vertical path through the earth-working range of movement of the mounting.

A further object is to provide a mid-mounting arrangement having the above characteristics that is economical to manufacture, strong, and adapted for easy installation on a tractor.

Other objects and advantages of the invention will become apparent upon reading the following detailed description and upon reference to the drawings, in which:

FIGURE 1 is a plan of a mid-mounting embodying the invention shown installed on a fragmentarily illustrated tractor; and FIG. 2 is a side elevation of the mounting and tractor appearing in FIG. 1.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Turning now to the drawings, there is shown a double mid-mounting structure embodying the invention secured to a tractor T that has been fragmentarily illustrated in phantom lines. The mounting is "double" in the sense that two complete mountings, each similar to the other but made to opposite hand, are provided on the tractor T. In FIG. 2, the mounting and an agricultural implement attached to it are shown in full lines lowered to a working position with the implement being in a vertical setting, whereas these parts are shown in dashed lines fully raised into the stowed or transport position.

Since the mountings at both sides of the tractor are similar, it will be sufficient to describe only the left-hand mounting and its supported implement in detail.

In the illustrated construction, the implement secured to the mounting is an argicultural cultivator consisting of a tool bar 10 supporting a plurality of laterally spaced tines 11 which depend from the bar 10. The tool bar is secured by a pair of U-bolts 12 to a carrier 13 which is a component of the mounting. The tool bar, in the working position of the implement is located at a level beneath the tractor T and between the front and rear axles of the tractor. The tool bar 10 may, therefore, be extended sideways beneath the tractor body 14 as is indicated by the dashed lines 10a in FIG. 1.

The mounting includes a frame 20 which is secured rigidly to the body 14 of the tractor. The frame 20 includes a central plate 21 mounted on the underside of the tractor body, longitudinal tubes 22 extending forward from the plate 21, side brackets 23 extending forward from the tubes and which are secured to the sides of the tractor body, transverse side shafts 24 extending outwardly from the tubes 22, and a girder 25 positioned between the ends of the shafts 24 and the brackets 23. In this preferred construction, the frame 20 is a single rigid structure common to the mounting at both sides of the tractor body 14.

The side shaft 24 of each mounting has upper and lower brackets 26 and 27 secured rigidly thereto with the upper bracket 26 having the form of an inverted U. The brackets 26, 27 serve, respectively, as supports for a lower arm 31 and an upper link 30 which are connected by pivot pins 32 and 33, to the respective brackets. The arm 31 is of a specifically strong construction being composed of two side members 34 braced by inner struts 35. In the working position, the link 30 and the arm 31 extend rearwardly from their pivots at a downward inclination and in parallel relationship.

The arm 31 is directly connected by a pivot pin 36 to the carrier 13. The upper link 30 is connected by a pivot pin 37 to a short link 38 that is pivotally connected at 39 to the carrier 13. The two forward pivots 32, 33 of the link 30 and the arm 31 are arranged in the same vertical plane, and their rear pivots 36, 37, are also arranged in the same vertical plane.

The carrier 13 is provided with a stop 40 against which the short link 38 is urged by a relatively strong, tensioned spring 41 which, in the illustrated construction, is extended between a forward extension 42 of the upper link 30 and a cross member 43 forming a portion of the lower arm 31.

The upper bracket 26 is fitted with an adjustable screw 50 that is disposed above the upper link 30 and serves as a limiting abutment for upward movement of this link.

The arm 31 has secured to it a short, upstanding projection 51 which is connected by a pushrod 52, whose length is adjustable, to a bracket 53. The bracket 53 is mounted on the left-hand one of the two laterally spaced lower hitch links 54 of the tractor T. It can be seen that the bracket 53, functioning as a lever arm, together with the pushrod 52 and the projection 51 serve as an actuator for raising and lowering the mounting.

The bracket 53 may be conveniently secured to the hitch link 54 by being clamped thereto by a pair of U-bolts 55. This connection is made rigid by means of a set screw 55a which is turned into engagement with the link 54 through a lug 55b projecting beneath the link 54 from the bracket 53. The bracket 53 is also provided with a rigidly extending arm 56, the end of which is connected to the associated hitch link 54 by a bolt 56a and which serves also as the means of pivotal connection between the associated drop link 57 and the hitch link.

The drop link 57 is, of course, a part of the conventional tractor power lift which also includes a turnable shaft 58 carrying a pair of lift arms 59 at its opposite ends. In addition, the usual stabilizer links 60 are provided to prevent undesirable lateral swing of the hitch links 54 (see FIG. 1).

The operation of the mounting can now be easily understood. When the mounting is in its lowered working position, that shown in full lines in FIG. 2, the short link 38 and the carrier 13 are completely rigid, with the short link being forced hard against the stop 40 by the spring 41. Thus, the upper link 30 with the lower arm 31 and the vertical link formed in effect by the frame 20, between the pivots 32, 33, together with the vertical composite link formed by the rigidly interconnected members 13, 38 between the pivots 36, 37, constitute a parallelogram linkage. The reactive force of the earth on the implement tines 11 as the tractor moves forwardly is resisted by this parallelogram linkage, and it will be seen that this force causes the short link 38 to bear even more solidly against the stop 40.

In order to lift the implement, the operator of the tractor controls the tractor hydraulic power lift in the usual way, the effect of which is to raise the lower hitch links 54. As a result, the pushrod 52 is operated to impart a counterclockwise turning motion to the arm 31 of the mounting with the result that the implement is raised from the ground. At first, because of the action of the parallelogram linkage, the implement tines 11 rise vertically, that is they retain the same setting which they had when fully lowered into their working position. This vertical motion continues through the full ground working range of the implement until the tines 11 are completely clear of the ground, whereupon the upper link 30 comes into contact with the abutment screw 50. Thereafter, the rising motion of the upper link 30 is arrested with the result that the carrier 13 rotates clockwise about its pivotal connections with the arm 31 and the short link 38 so as to swing the tines 11 forward and upwardly. In this motion, the short link 38 is withdrawn from the stop 40 against the resistance of the spring 41. Finally, upon continued upward swinging movement of the arm 31, the implement reaches its uppermost position, shown in dashed lines in FIG. 2, in which it is stowed in a non-obstructive position adjacent to the tractor body 14 with the tines 11 approximately horizontal. In lowering the implement, the operator of the tractor simply operates the power lift to lower the hitch links 54.

I claim as my invention:

1. A mid-mounting arrangement for supporting an agricultural implement beneath the body of a tractor comprising, in combination, a frame anchored to said tractor body, an arm pivoted about a horizontal axis on said frame and extending downwardly, a carrier rigidly holding said implement, said carrier being pivoted about a horizontal axis at the lower end of said arm, a first link pivoted on said frame and generally paralleling said arm, a second pivoted link interconnecting said first link and said carrier, a stop surface on said carrier for abutting said second link when a parallelogram linkage is formed with said arm and said first link being one pair of parallel links and said frame and said carrier with said second link being the other pair of parallel links, means for urging said link against said stop surface, an actuator for swinging said arm about its frame axis so as to raise and lower said implement through a ground working range without changing its angular disposition with respect to the ground, and a stop for arresting upward movement of said first link at the upper end of said range so that further upward movement of said arm swings said carrier about said second link and disposes the implement in transport position.

2. A mid-mounting arrangement for supporting an agricultural implement beneath the body of a tractor having a power-lifted rear hitch link comprising, in combination, a frame anchored to said tractor body, an arm pivoted about a horizontal axis on said frame and extending downwardly, a carrier rigidly holding said implement, said carrier being pivoted about a horizontal axis at the lower end of said arm, a first link pivoted on said frame and generally paralleling said arm, a second pivoted link interconnecting said first link and said carrier, a stop surface on said carrier for abutting said second link when a parallelogram linkage is formed with said arm and said first link being one pair of parallel links and said frame and said carrier with said second link being the other pair of parallel links, means for urging said link against said stop surface, a push rod connecting said rear hitch link and said arm for swinging the arm about its frame axis as the hitch link is raised and lowered so as to raise and lower said implement through a ground working range without changing its angular disposition with respect to the ground, and a stop for arresting upward movement of said first link at the upper end of said range so that further upward movement of said arm swings said carrier about said second link and disposes the implement in transport position.

References Cited in the file of this patent

UNITED STATES PATENTS

| 2,390,767 | Alderman | Dec. 11, 1945 |
| 2,631,513 | Silver et al. | Mar. 17, 1953 |
| 2,660,939 | Pool et al. | Dec. 1, 1953 |
| 2,793,577 | Paige | May 28, 1957 |